United States Patent [19]

Murray

[11] 4,116,407
[45] Sep. 26, 1978

[54] HANG GLIDER WITH COLLAPSIBLE AIRFOIL

[76] Inventor: Stephen C. Murray, 33871 El Encanto, Dana Point, Calif. 92629

[21] Appl. No.: 728,785

[22] Filed: Oct. 1, 1976

[51] Int. Cl.² .............................................. B64C 31/02
[52] U.S. Cl. ................................. 244/16; 244/DIG. 1
[58] Field of Search ................... 244/16, DIG. 2, 123, 244/124, 142, 145, 154; 114/102, 103, 105, 108, 112, 90

[56] References Cited

U.S. PATENT DOCUMENTS

| 1,730,249 | 10/1929 | Smith | 244/DIG. 1 |
|---|---|---|---|
| 2,561,253 | 7/1951 | Wells-Coates | 114/90 |
| 3,132,620 | 5/1964 | Court | 114/102 |
| 3,438,597 | 4/1969 | Kasper | 244/16 |
| 3,558,087 | 1/1971 | Barish | 244/142 |

FOREIGN PATENT DOCUMENTS

| 679,249 | 7/1939 | Fed. Rep. of Germany | 244/DIG. 1 |
|---|---|---|---|
| 1,921,682 | 11/1970 | Fed. Rep. of Germany | 114/102 |

Primary Examiner—Trygve M. Blix
Assistant Examiner—Charles E. Frankfort
Attorney, Agent, or Firm—Gordon L. Peterson

[57] ABSTRACT

A device capable of flight comprising a wing which includes a leading edge member. The leading edge member has an aerodynamically shaped exterior surface and upper and lower aft sections. The wing also includes upper and lower flexible membranes, a first connector for attaching the upper flexible membrane adjacent the forward region thereof to the upper aft section of the leading edge member and second connector for attaching the lower flexible membrane adjacent a forward region thereof to the lower aft section of the leading edge member. The flexible membranes are joined together rearwardly of the leading edge member. At least one of the connectors includes a track. A member carried by one of the flexible membranes is received in the track and cooperates therewith to attach such flexible membrane to the leading edge member. A support or other device is coupled to the wing for supporting a load.

12 Claims, 8 Drawing Figures

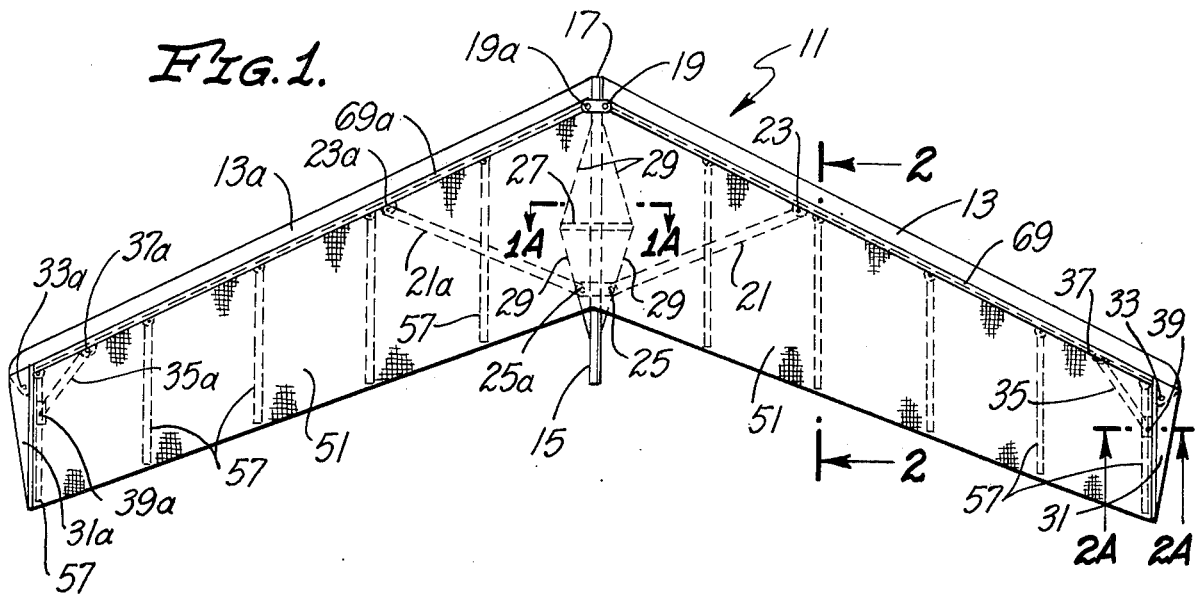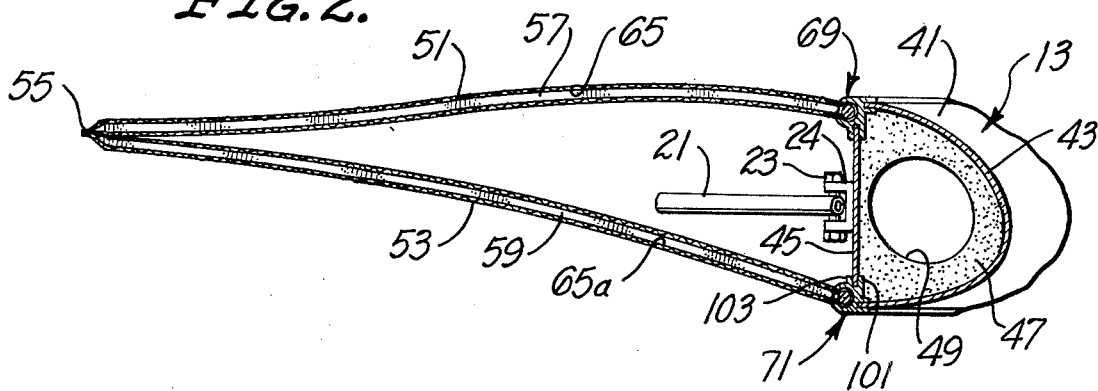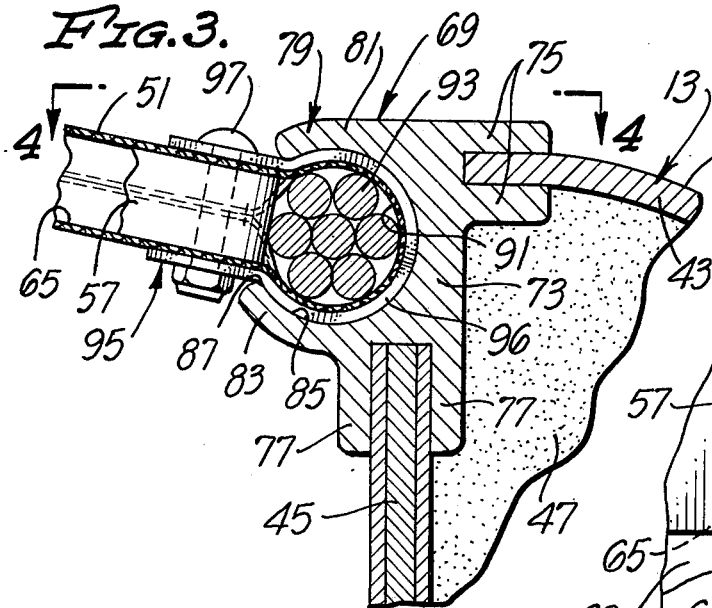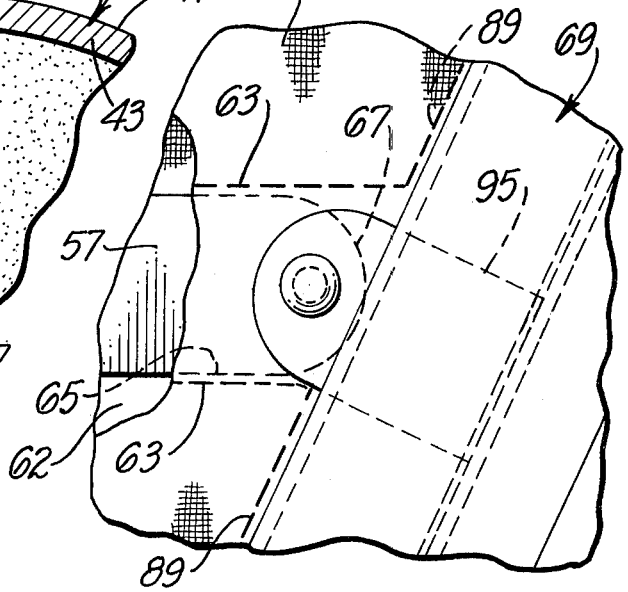

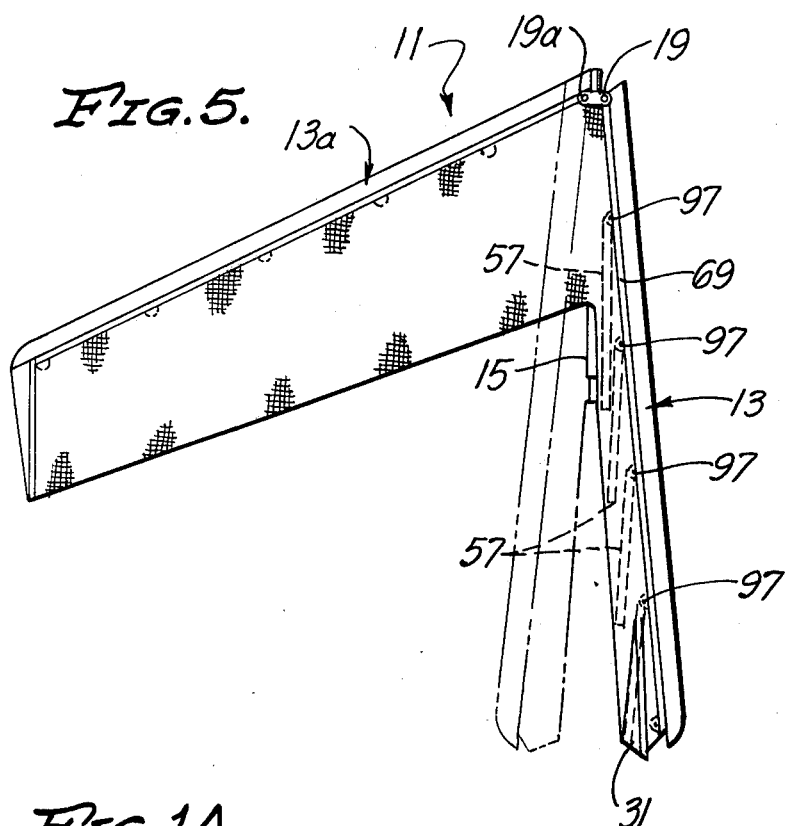
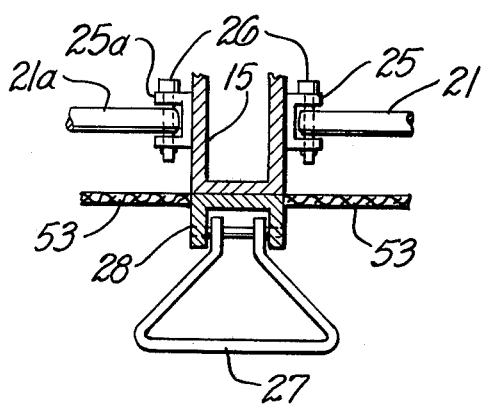
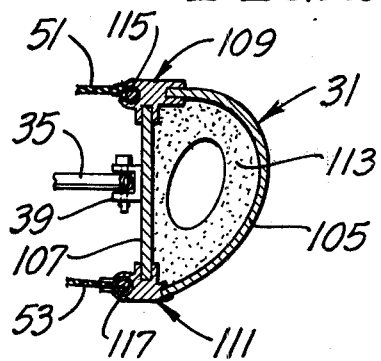
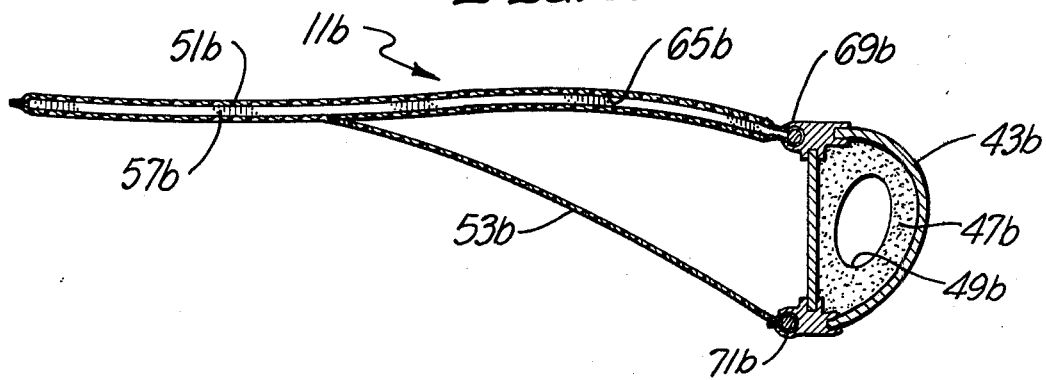

HANG GLIDER WITH COLLAPSIBLE AIRFOIL

BACKGROUND OF THE INVENTION

A hang glider typically includes a sail or flexible membrane, a frame to support the sail, and a support attached to the frame. In use, the pilot holds the support and is able to soar through the air.

The majority of flexible wing hang gliders use a single surface, flexible membrane to provide an airfoil shape. The flexible membrane is attached to the frame by wrapping a portion of the flexible membrane around a frame member and stitching the flexible membrane to form a permanent attachment. In flight, air pressure forces the membrane into an airfoil shape. A hang glider of this type is shown, for example, in my U.S. Pat. No. 3,936,012.

While a hang glider of the above-described type works very satisfactorily, an improved airfoil can be obtained when upper and lower flexible membranes are used. One approach is to use the doped fabric construction which has been used for aircraft wings. One problem with the doped fabric construction is that the fabric becomes relatively rigid. A rigid fabric is not suited for hang glider usage in that the rigid fabric cannot be folded, and so it would be impossible to collapse the hang glider.

SUMMARY OF THE INVENTION

The present invention provides a wing which utilizes upper and lower flexible membranes and eliminates the doped fabric approach discussed above. The terms upper and lower refer to the relative position of the flexible membranes when the wing is in level flight. With this invention, the hang glider includes a leading edge member of relatively rigid construction and having an aerodynamically shaped exterior surface and upper and lower aft sections. Upper and lower flexible membranes are attached to the upper and lower aft sections, respectively, of the leading edge member. The flexible membranes are joined together at regions spaced rearwardly from the forward regions thereof. Stiffening elements or ribs may be carried by one or both of the flexible membranes to stiffen the membranes. The resultant wing construction provides the desired airfoil shape.

One feature of the invention is the manner in which the flexible membranes are attached to the relatively rigid leading edge member. In the prior art, this attachment has been obtained, as indicated above, by wrapping the flexible membrane around the leading edge member and then stitching the flexible membrane to form a permanent attachment. This process is time consuming and is totally unsuited to a construction in which the leading edge member forms the forward portion of the airfoil.

With this invention, a connector which performs a multiplicity of important functions is employed to attach each of the flexible membranes to the leading edge member. In order to attach the flexible membrane to the leading edge member, the connector includes means defining a track and means are provided on the forward region of an associated flexible membrane for being received by the track and for cooperating therewith to attach the flexible membrane to the leading edge member. In a preferred construction, an elongated flexible element is carried by the forward region of the flexible membrane and is slidably received within the track to attach the connector to the flexible membrane.

To further provide for a strong connection between the flexible membrane and the leading edge member, a coupling member is attached to the rib and is receivable in the track. In this manner, a mechanical connection between the relatively stiff rib and the track is also obtained. Interference between the coupling member and the flexible element is avoided by providing a passage through the coupling member through which the elongated flexible element can extend.

The connector can be attached to the relatively rigid leading edge member in various different ways. However, in a preferred embodiment, the leading edge member includes an aft panel and a frontal skin, each having edge portions adjacent the connector. The connector includes first and second pairs of spaced flanges for receiving the edge portions of the aft panel and the frontal skin, respectively. The edge portions can be riveted or otherwise secured to the associated pair of flanges of the connector. This construction, not only attaches the leading edge member to the connector, but also serves to attach two of the separate components of the leading edge member.

The connector is relatively inexpensive in that it can be extruded and cut to the desired length. The connector is preferably constructed of a lightweight, relatively rigid material, such as aluminum. The cross section of the preferred form of the connector is such as to provide substantial rigidity against bending loads. As a consequence, the connector also serves as a structural member and allows elimination of many of the cables which have been heretofore customarily used in hang gliders of the type shown in my U.S. Pat. No. 3,936,012.

When the wing of this invention is used in a hang glider, the hang glider may include, for example, first and second leading edge members, a keel, and means for interconnecting the leading edge members and the keel to allow the leading edge members to be pivoted relative to the keel. First and second cross members are connected to the first and second leading edge members, respectively, and to the keel. The resulting construction may generally take the form of two wings with the support for carrying the pilot being suspended below the wings.

One important feature of a hang glider is that it must be collapsible to facilitate its transport and storage. It should also be easy to put up for use. These features are important, not only from the standpoint of operator convenience, but to reduce the likelihood of damage to the hang glider and injury to the pilot when the hang glider is put up or collapsed during relatively windy conditions.

Customarily, a hang glider is collapsed by pivoting the leading edge members inwardly toward the keel, as shown in my U.S. Pat. No. 3,936,012. However, with the present invention, the ribs carried by the flexible membranes are relatively stiff and would prevent complete collapse of the hang glider. To solve this problem, the present invention provides for pivotally coupling the rib to the track to allow relative pivotal movement between the rib and the track. With the rib being pivotable relative to the track, it does not interfere with the collapsing of the hang glider. This can be accomplished, for example, by pivotally attaching the coupling member to the rib.

Another advantage of the connector is that the flexible membranes can be completely removed from the leading edge members by simply sliding the coupling member and the flexible element along with the associated flexible membrane out of one end of the track.

The concepts of this invention can be used to define airfoils of various different configurations. For example, the flexible membranes can be joined together along their aft edge portions. Alternatively, an aft edge portion of the lower membrane may be joined to a region of the upper flexible membrane which is intermediate the forward and aft edges thereof. This simplifies construction and reduces cost.

It should be understood that many concepts of this invention are applicable to the attachment of a flexible membrane to the frame of a hang glider, and that these concepts are not limited to a wing or hang glider which includes upper and lower flexible membranes and/or aerodynamically shaped leading edge members. For example, the connector having a track can be provided on a conventional leading edge member and can be used to attach a single flexible membrane to such leading edge member. In other words, these concepts of the invention are not limited to any particular kind or number of flexible membranes nor to any particular kind or shape of leading edge members, although the invention is particularly adapted for use with a wing or hang glider having both upper and lower flexible membranes.

The invention, together with further features and advantages thereof, may best be understood by reference to the following description taken in connection with the accompanying illustrative drawing.

BRIEF DESCRIPTION OF THE DRAWING

FIG. 1 is a top plan view of a hang glider constructed in accordance with the teachings of this invention.

FIG. 1A is an enlarged, fragmentary sectional view taken generally along line 1A—1A of FIG. 1.

FIG. 2 is an enlarged, fragmentary sectional view taken generally along line 2—2 of FIG. 1.

FIG. 2A is an enlarged, fragmentary sectional view taken generally along line 2A—2A of FIG. 1.

FIG. 3 is an enlarged, fragmentary sectional view showing a preferred way for connecting one of the flexible membranes to the leading edge member.

FIG. 4 is a fragmentary plan view taken generally along line 4—4 of FIG. 3.

FIG. 5 is a plan view similar to FIG. 1 illustrating how the hang glider can be collapsed.

FIG. 6 is a view similar to FIG. 2 of a second embodiment of the invention.

DESCRIPTION OF THE PREFERRED EMBODIMENT

FIG. 1 shows a hang glider 11 which generally includes identical leading edge members 13 and 13a, a keel 15, and a nose block 17. The nose block 17 suitably pivotally joins the leading edge members 13 and 13a to the keel 15 for pivotal movement about pivot axes 19 and 19a, respectively, with such pivot axes being vertical in the position of the hang glider 11 illustrated in FIG. 1.

The hang glider 11 also includes identical cross members 21 and 21a which are suitably attached to the leading edge members 13 and 13a by fittings 23 and 23a, respectively, and by threaded fasteners 24 (FIG. 2). The inboard ends of the cross members 21 and 21a are connected to the keel 15 rearwardly of the nose block 17 by suitable fittings 25 and 25a, respectively, and by threaded fasteners 26 (FIG. 1A).

A support in the form of a control bar 27 is suitably pendulously supported on the keel 15 as by a fitting 28 (FIG. 1A) attached to the keel. The control bar 27 is stabilized by cables 29 which are attached to the opposite lower ends of the control bar 27. As shown in FIG. 1, two of the cables 29 extend forwardly and are suitably coupled to the keel 15 adjacent the forward end thereof and two of the cables 29 extend aft and are suitably coupled to the keel 15 adjacent the aft end thereof.

The leading edge members 13 and 13a, the keel 15, the cross members 21 and 21a, and side edge members 31 and 31a form the primary elements of a frame for the hang glider 11. The hang glider frame can be of various different constructions, and the components thereof can be interconnected in various different ways. For this reason, the frame is not shown in greater detail herein.

The side edge members 31 and 31a are attached to the outboard ends of the leading edge members 13 and 13a, respectively, by hinges 33 and 33a, respectively. The hinges 33 and 33a enable the side edge members 31 to be pivoted inwardly, as viewed in FIG. 1, about vertical pivot axes. The side edge members 31 and 31a are held in extended positions shown in FIG. 1 by struts 35 and 35a, respectively. The strut 35 is attached by a fitting 37 to the leading edge member 13, which fitting may be substantially identical to the fitting 23 (FIG. 2). The strut 35 is removably attached to the side edge member 31 by a fitting 39 (FIGS. 1 and 2A) which may also be substantially identical to the fitting 23. The strut 35a is similarly attached to the leading edge member 13a and the side edge member 31a by fittings 37a and 39a, respectively.

Each of the side edge members 31 and 31a is relatively rigid and has an aerodynamically contoured exterior surface and is constructed of strong, lightweight materials. For example, each of the side edge members 31 and 31a may be constructed in a manner similar to the leading edge member 13.

The leading edge member 13 is a relatively rigid member having an aerodynamically shaped exterior surface 41 (FIG. 2) which forms the forward portion of an airfoil. Although the leading edge member 13 could be constructed in different ways, in the embodiment illustrated, it includes a frontal skin 43, an aft panel 45, and a plurality of ribs 47 (only one being illustrated in FIG. 2) which are spaced longitudinally along the leading edge member 13.

Each of the components of the leading edge member 13 can be constructed in different ways and of various different materials. For example, the frontal skin 43 may be constructed of one or more layers of aluminum, fiberglass, or plastic. The aft panel 45 may be constructed of plastic, wood, metal, or be of sandwich construction. The ribs 47 may be of similar material; however, in the embodiment illustrated, they are constructed of foam plastic material and each of them has a central aperture 49 to reduce its weight. Generally, the materials of the leading edge member 13 should be strong and lightweight and be capable of providing the leading edge member 13 with substantial rigidity. The frontal skin 43 and the panel 45 preferably extend continuously throughout the full length of the leading edge member 13.

The hang glider 11 also includes flexible membrane means which, in the embodiment illustrated, includes an upper flexible membrane 51 and a lower flexible membrane 53. The flexible membranes 51 and 53 can be constructed of any flexible material suitable for hang glider usage. For example, a woven synthetic fabric, such as Dacron, may be utilized. The flexible membranes 51 and 53, in the embodiment illustrated, extend continuously from the full width of the hang glider 11. Each of the flexible membranes 51 and 53 may be formed from one or more sections of fabric. In the embodiment illustrated, each of the flexible membranes 51 and 53 is constructed of multiple sections of fabric which are appropriately sewed together. The flexible membranes 51 and 53 are also appropriately sewed together along the aft edge 55 of the wing. However, the membranes 51 and 53 may be integrally joined by a fold at the aft edge 55, if desired.

A plurality of ribs 57 is suitably carried by the upper flexible membrane 51. In the embodiment illustrated, each of the wings includes five of the ribs 57 arranged in parallel, equally spaced relationship along the wing; however, obviously other numbers and arrangements of the ribs can be used, if desired. The ribs are parallel to the keel 15. Each of the ribs 57 is a relatively stiff, lightweight member, and any relatively lightweight member which will serve to stiffen the upper flexible membrane 51 can be employed as a rib. In the embodiment illustrated, ribs 59 are carried by the lower flexible membrane 53. The ribs 59 are shaped slightly differently from the ribs 57, as shown in FIG. 2, but are otherwise constructed and arranged in the same manner as the ribs 57.

The ribs 57 may be carried by the upper flexible membrane 51 in various different ways. As indicated above, in the embodiment illustrated, each of the flexible membranes 51 and 53 is formed by sewing together multiple sections of fabric. Two of such sections 61 and 62 are shown in FIG. 4. Specifically, the section 62 overlies the section 61 and these two sections are sewed together along spaced parallel seams to define a pocket 65 for the rib 57. Thus, the upper seam, as viewed in FIG. 4, extends along the upper edge of the section 62, and the lower seam 63, as viewed in FIG. 4, extends along the lower edge of the section 61. One of the pockets 65 is provided for each of the ribs 57. The aft end of each of the pockets 65 is openable to allow insertion of one of the ribs 57 therein and the ribs can be retained in the pockets in any suitable manner. If desired, each of the ribs may have a rounded forward edge 67 (FIG. 4). The ribs 59 may be similarly retained in pockets 65a defined by the lower flexible membrane 53.

An upper connector 69 and a lower connector 71 are provided for, among other things, attaching the upper flexible membrane 51 and the lower flexible membrane 53, respectively, to the leading edge member 13. The leading edge member 13a is provided with identical connectors for attaching the upper and lower flexible membranes 51 and 53 to the leading edge member 13a. The connectors 69 and 71 are located at the upper and lower aft sections of the leading edge member 13. Because the lower connector 71 is basically identical to the upper connector 69, only the upper connector 69 is described in detail herein.

The connector 69 is constructed of a strong, lightweight material, such as aluminum or plastic, and in the embodiment illustrated, it is extruded from aluminum. The cross section of the connector 69 shown in FIG. 3 is continuous throughout its full length. The connector 69 includes a body section 73 (FIG. 3), a first pair of spaced parallel flanges 75, and a second pair of spaced parallel flanges 77. The flanges 75 and 77 extend at right angles relative to each other. The flanges 75 receive an aft edge portion of the frontal skin 43, and the flanges 77 receive an upper edge portion of the aft panel 45. The flanges 75 and 77 can be riveted or otherwise attached to the frontal skin 43 and the aft panel 45. Thus, one important function of the connector 69 is to join the frontal skin 43 and the aft panel 45.

The connector 69 also includes a track 79 which comprises spaced curved flanges 81 and 83 which define an arcuate groove 85 which opens generally rearwardly through an elongated slot 87.

A second important function of the connector 69 is to join the flexible membrane 51 to the leading edge member 13. To accomplish this, a marginal forward portion of the upper flexible membrane 51 is folded back on itself and sewed along a seam 89, with such seam being interrupted at the forward end of each of the pockets 65 to define an elongated pocket 91 for receiving an elongated flexible element 93 which runs for the full length of the connector 69. Although the elongated flexible element 93 may take different forms, in the embodiment illustrated, it is in the form of a cable. The flexible element 93 and the pocket 91 can be inserted into one of the ends of the groove 85 of the track 79 and slid down the groove to thereby attach the upper flexible membrane 51 to the connector 69.

Each of the ribs 57 is attached to the connector 69 by a coupling member 95. In the embodiment illustrated, the coupling member 95 is in the form of a metal strap which lies outside of the flexible membrane 51. The coupling 95 has an arcuate section 96 which is shaped to generally conform to the configuration of the groove 85.

It is desirable to pivotally attach each of the battens 57 to the connector 69. Although this can be accomplished in different ways, in the embodiment illustrated, each of the coupling members 95 is pivotally attached by a threaded fastener 97, such as a nut and bolt, to a forward region of the rib 57.

The lower connector 71 similarly has pairs of flanges 101 and 103 for receiving the adjacent edge portions of the frontal skin 43 and the aft panel 45. The connector 71 is identical to the connector 69 except that the flanges 103 extend upwardly, whereas the corresponding flanges 77 of the connector 69 extend downwardly.

As shown in FIGS. 1A and 2, the cross members 21 and 21a and the associated fittings are between the upper and lower flexible membranes 51 and 53. The fittings 23 and 37 are mounted on the aft panel 45. In the embodiment illustrated, the lower flexible membrane 53 lies immediately below the lower surface of the keel 15, and an opening is formed in the lower flexible membrane 53 through which the fitting 28 extends for the control bar 27. The struts 35 and 35a are similarly between the flexible membranes 51 and 53. Appropriate openings may be provided in one or both of the flexible membranes 51 and 53 to provide access to the various fittings, such as the fittings 25, 25a, 39 and 39a.

In order to keep the flexible membranes 51 and 53 tightly stretched between the side edge members 31 and 31a, the flexible membranes are preferably coupled to the side edge members. Although this can be accomplished in different ways, it is preferably accomplished as shown in FIG. 2A which shows a side edge member 31 as comprising a side skin 105 and an inner panel 107 interconnected by connectors 109 and 111 with ribs 113 being provided to strengthen the side edge member. The side skin 105, the inner panel 107, the connectors 109 and 111 and the ribs 113 are all very similar to the frontal skin 43, the aft panel 45, the connectors 69 and 71 and the ribs 47, respectively, of the leading edge member 13. As shown in FIG. 2A, the strut 35 is mounted on the inner panel 107 by the fitting 39. The side edges of the flexible membranes 51 and 53 have pockets for carrying flexible elements in the form of cables 115 and 117 which are received within tracks formed by the connectors 109 and 111, respectively, to thereby attach the side edges of the flexible membranes to the side edge member 31. The side edge member 31a is similarly constructed.

In use of the hang glider 11, the connector 69 serves many useful functions. For example, it permanently attaches the upper edge portions of the frontal skin 43 and the aft panel 45. The connector 69 also tightly joins the forward region of the upper flexible membrane 51 to the leading edge member 13. The diameter of the flexible element 93 is too large to pass through the slot 87 so the full length of the forward edge of the upper flexible membrane 51 cannot be withdrawn from the connector 69 through the slot 87. In addition, the coupling members 95 mechanically join the ribs 57 to the connector 69. Also, in flight, the connector 69 serves as a rigid structural member and materially strengthens the hang glider 11.

One of the most important functions of the construction shown in FIG. 3 is in collapsing the hang glider 11. With the side edge members 31 and 31a disconnected from the fittings 39 and 39a, respectively, each of the side edge members may be pivoted relative to the leading edge members. With the cross members 21 and 21a disconnected from the fittings 25 and 25a, respectively, the leading edge members 13 and 13a can be pivoted inwardly about the pivot axes 19 and 19a, respectively, toward the keel 15. FIG. 5 shows the hang glider 11 with the leading edge member 13 being pivoted inwardly toward the keel 15. As the leading edge member 13 is pivoted inwardly toward the position shown in FIG. 5, each of the ribs 57 pivots about the associated fastener 97 to thereby permit the inward pivoting movement of the leading edge member 13 to continue. If the ribs 57 were not pivotally coupled to the connector 69, collapse of the hang glider 11 would not be possible. The leading edge member 13a may be similarly pivoted to a collapsed position.

FIG. 6 shows a hang glider 11b which is identical to the hang glider 11 in all respects not specifically shown or described herein. Portions of the hang glider 11b corresponding to portions of the hang glider 11 are designated by corresponding reference characters followed by the letter "b."

The only differences between the hang glider 11b and the hang glider 11 are that the lower flexible membrane 53b does not have ribs and it is attached as by sewing to a central region of the upper flexible membrane 51b. In addition, the lower membrane 53b may have openings (not shown) to permit the cross members to extend through the lower membrane.

Although an exemplary embodiment of the invention has been shown and described, many changes, modifications and substitutions may be made by one having ordinary skill in the art without necessarily departing from the spirit and scope of this invention.

I claim:

1. A device capable of flight comprising:
   a frame including first and second leading edge members, a keel, means for interconnecting the leading edge members and the keel to allow the leading edge members to be pivoted relative to the keel, and first and second cross members connectable to said first and second leading edge members, respectively, and to said keel;
   flexible membrane means for forming an airfoil;
   means for attaching the flexible membrane means to said frame;
   said attaching means including means defining a track on said first leading edge member, and first means on the flexible membrane means for being received by said track and for cooperating therewith to attach said flexible membrane means to said first leading edge member;
   means coupled to said frame for supporting a load; and
   a rib and means for carrying said rib on said flexible membrane means, said first means including means for pivotally coupling the rib to the track to allow relative pivotal movement between the rib and the track.

2. A device as defined in claim 1 wherein said first means includes an elongated flexible element carried by said flexible membrane means and receivable by said track.

3. A device capable of flight comprising:
   first and second leading edge members;
   a keel;
   means for interconnecting the leading edge members and the keel to allow the leading edge members to be pivoted relative to the keel;
   first and second cross members connectable to said first and second leading edge members, respectively, and to said keel;
   each of said leading edge members having an aerodynamically shaped exterior surface and upper and lower aft sections;
   upper and lower flexible membranes;
   first connector means for attaching the upper flexible membrane adjacent a forward region thereof to said upper aft sections of said leading edge members and second connector means for attaching the lower flexible membrane adjacent a forward region thereof to said lower aft sections of said leading edge members;
   means for joining said membranes together at regions spaced rearwardly from said forward regions thereof;
   at least one of said connector means including means defining a track on said first leading edge member;
   first means on the forward region of the flexible membrane associated with said one connector means for being received by said track and for cooperating therewith to attach said associated flexible membrane to said first leading edge member; and
   a rib and means for carrying said rib on said associated flexible membrane, said first means including means for pivotally coupling the rib to the track to allow relative pivotal movement between the rib and the track whereby such pivotal movement facilitates manually collapsing the device.

4. A device as defined in claim 3 wherein said pivotal coupling means includes a coupling member pivotally attached to the rib and receivable in the track and said first means includes an elongated flexible element carried by said associated flexible membrane and receivable in said track to attach the associated flexible membrane to the first leading edge member.

5. A device as defined in claim 4 wherein said first leading edge member includes an aft panel and a frontal skin each having edge portions adjacent said one connector means, and said one connector means includes first and second pairs of spaced flanges for receiving the edge portions of said aft panel and said frontal skin, respectively, said track defining means includes first and second flanges spaced apart to define a slot extending along said first leading edge member and opening generally rearwardly of said first leading edge member.

6. A device as defined in claim 3 wherein said cross members are between said upper and lower flexible membranes.

7. A device as defined in claim 3 including first and second side edge members attached to the outboard ends of said first and second leading edge members, respectively, and means for attaching said upper and lower flexible membranes to both of said side edge members.

8. A device capable of flight comprising:
a wing including a leading edge member, said leading edge member having an aerodynamically shaped exterior surface and upper and lower aft sections;
said wing including upper and lower flexible membranes, first connector means for attaching the upper flexible membrane adjacent a forward region thereof to said upper aft section of said leading edge member, second connector means for attaching the lower flexible membrane adjacent a forward region thereof to said lower aft section of said leading edge member, and means for joining said flexible membranes together at regions spaced rearwardly from said forward regions;
at least one of said connector means including means defining a track;
first means on the forward region of the flexible membrane associated with said one connector means for being received by said track and cooperating therewith to attach said associated flexible membrane to said leading edge member;
means coupled to said wing for supporting a load; and
said associated flexible membrane including a pocket, said wing including a rib receivable in said pocket, and said first means including a coupling member coupled to said rib and receivable in said track and means for pivotally coupling the coupling member to the rib.

9. A device as defined in claim 8 wherein said leading edge member includes an aft panel and a frontal skin each having edge portions adjacent said one connector means, said one connector means includes first and second pairs of spaced flanges for receiving the edge portions of said aft panel and said frontal skin, respectively, and said first means includes an elongated element carried by said associated flexible membrane and receivable by said track.

10. A device as defined in claim 9 wherein said elongated element is flexible and extends through said coupling member.

11. A device capable of flight comprising:
a wing including a leading edge member, said leading edge member having an aerodynamically shaped exterior surface and upper and lower aft sections;
said wing including upper and lower flexible membranes, first connector means for attaching the upper flexible membrane adjacent a forward region thereof to said upper aft section of said leading edge member, second connector means for attaching the lower flexible membrane adjacent a forward region thereof to to said lower aft section of said leading edge member, and means for joining said flexible membranes together at regions spaced rearwardly from said forward regions;
at least one of said connector means including means defining a track;
first means on the forward region of the flexible membrane associated with said one connector means for being received by said track and cooperating therewith to attach said associated flexible membrane to said leading edge member;
means coupled to said wing for supporting a load;
said leading edge member including an aft panel and a frontal skin having edge portions adjacent said one connector means, said one connector means including first and second pairs of spaced flanges for receiving said edge portions of said aft panel and said frontal skin, respectively; and
said upper flexible membrane including at least one pocket, said wing including a rib receivable in said pocket, and said means for joining joins an aft region of the lower flexible membrane to a region of the upper flexible membrane which lies between the forward and aft regions of the upper flexible membrane, said first means including means for pivotally coupling the rib to the track to allow relative pivotal movement between the rib and the track.

12. A device as defined in claim 11 wherein said first means includes an elongated flexible element receivable by said track.

* * * * *